United States Patent
Mummadi et al.

(10) Patent No.: US 12,400,006 B2
(45) Date of Patent: *Aug. 26, 2025

(54) SYSTEM AND METHOD WITH MASKING FOR CERTIFIED DEFENSES AGAINST ADVERSARIAL PATCHES

(71) Applicant: Robert Bosch GmbH, Stuttgart (DE)

(72) Inventors: Chaithanya Kumar Mummadi, Pittsburgh, PA (US); Wan-Yi Lin, Pittsburgh, PA (US); Filipe Condessa, Pittsburgh, PA (US); Aniruddha Saha, Elkridge, MD (US); Shuhua Yu, Pittsburgh, PA (US)

(73) Assignee: Robert Bosch GmbH, Stuttgart (DE)

( * ) Notice: Subject to any disclaimer, the term of this patent is extended or adjusted under 35 U.S.C. 154(b) by 150 days.

This patent is subject to a terminal disclaimer.

(21) Appl. No.: 18/332,365

(22) Filed: Jun. 9, 2023

(65) Prior Publication Data

US 2024/0411892 A1    Dec. 12, 2024

(51) Int. Cl.
*G06F 21/00* (2013.01)
*G06F 21/57* (2013.01)
*G06F 21/64* (2013.01)

(52) U.S. Cl.
CPC ............ *G06F 21/577* (2013.01); *G06F 21/64* (2013.01); *G06F 2221/033* (2013.01)

(58) Field of Classification Search
CPC ... G06F 21/577; G06F 21/64; G06F 2221/033
See application file for complete search history.

(56) References Cited

U.S. PATENT DOCUMENTS

2021/0157911 A1* 5/2021 Yu .............................. G06N 3/08
2023/0359900 A1* 11/2023 Li ........................... G06V 10/764

OTHER PUBLICATIONS

Xiang et al., "PatchCleanser: Certifiably Robust Defense against Adversarial Patches for Any Image Classifier," arXiv:2108.09135v2, Apr. 8, 2022, pp. 1-22.

* cited by examiner

*Primary Examiner* — Ghazal B Shehni
(74) *Attorney, Agent, or Firm* — Kathy Takeguchi; Maginot, Moore & Beck LLP

(57) ABSTRACT

A computer-implemented system and method relate to certified robust defenses against adversarial patches. A set of one-mask images are generated using a source image and a first mask at a set of predetermined image regions. The set of predetermined image regions collectively cover at least every pixel of the source image. A particular one-mask image with a highest prediction loss is selected from among the set of one-mask images. A set of two-mask images is generated using the selected one-mask image and a second mask at the set of predetermined image regions. A particular two-mask image with a highest prediction loss is selected from among the set of two-mask images. The machine learning system is trained using a training dataset, which includes the selected two-mask image.

20 Claims, 8 Drawing Sheets

REFERENCE EXAMPLES

REFERENCE EXAMPLES

SYSTEM AND METHOD WITH MASKING FOR CERTIFIED DEFENSES AGAINST ADVERSARIAL PATCHES

TECHNICAL FIELD

This disclosure relates generally to computer vision, and more particularly to digital image processing with certified defenses against adversarial patch attacks.

BACKGROUND

Deep learning based image classifiers are vulnerable to adversarial patches applied to the input, where image pixels bounded within a confined connected region, usually square or circular, can be adversarial and crafted to induce misclassification. Patch attacks are formulated in this way to mimic printing and placing an adversarial object in the scene. It is easier to realize a patch attack in the physical world compared to full image adversarial perturbation, as the latter might need a compromise in a computing system. Therefore, adversarial patch attacks pose a significant threat to real-world computer vision systems.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a computer-implemented method relates to certified robust defenses against adversarial patches. The method includes receiving a source image. The method inclueides generating a set of one-mask images using the source image and a first mask at a set of predetermined image regions. Each one-mask image includes the first mask at a different predetermined image region of the source image. The set of predetermined image regions collectively cover at least every pixel of the source image. The method includes generating, via a machine learning system, a set of predictions in response to receiving the set of one-mask images. The method includes selecting a particular one-mask image with a highest prediction loss from among the set of one-mask images. The method includes generating a set of two-mask images using the selected one-mask image and a second mask at the set of predetermined image regions. Each two-mask image includes the second mask at a different predetermined image region of the selected one-mask image. The method includes generating, via the machine learning system, another set of predictions in response to receiving the set of two-mask images. The method includes selecting a particular two-mask image with a highest prediction loss from among the set of two-mask images. The method includes generating a training dataset that includes the selected two-mask image. The method includes training the machine learning system using the training dataset.

According to at least one aspect, a system includes at least one processor and at least one computer-readable medium. The at least one computer readable medium is in data communication with the at least one processor. The at least one computer-readable medium has computer readable data including instructions stored thereon that, when executed by the at least one processor, causes the at least one processor to perform a method related to certified robust defenses against adversarial patches. The method includes receiving a source image. The method inclueides generating a set of one-mask images using the source image and a first mask at a set of predetermined image regions. Each one-mask image includes the first mask at a different predetermined image region of the source image. The set of predetermined image regions collectively cover at least every pixel of the source image. The method includes generating, via a machine learning system, a set of predictions in response to receiving the set of one-mask images. The method includes selecting a particular one-mask image with a highest prediction loss from among the set of one-mask images. The method includes generating a set of two-mask images using the selected one-mask image and a second mask at the set of predetermined image regions. Each two-mask image includes the second mask at a different predetermined image region of the selected one-mask image. The method includes generating, via the machine learning system, another set of predictions in response to receiving the set of two-mask images. The method includes selecting a particular two-mask image with a highest prediction loss from among the set of two-mask images. The method includes generating a training dataset that includes the selected two-mask image. The method includes training the machine learning system using the training dataset.

According to at least one aspect, one or more non-transitory computer readable mediums have computer readable data including instructions stored thereon that, when executed by at least one processor, cause the at least one processor to perform a method relating to certified defenses against adversarial patches. The method includes receiving a source image. The method includes generating a set of one-mask images using the source image and a first mask at a set of predetermined image regions. Each one-mask image includes the first mask at a different predetermined image region of the source image. The set of predetermined image regions collectively cover at least every pixel of the source image. The method includes generating, via a machine learning system, a set of predictions in response to receiving the set of one-mask images. The method includes selecting a particular one-mask image with a highest prediction loss from among the set of one-mask images. The method includes generating a set of two-mask images using the selected one-mask image and a second mask at the set of predetermined image regions. Each two-mask image includes the second mask at a different predetermined image region of the selected one-mask image. The method includes generating, via the machine learning system, another set of predictions in response to receiving the set of two-mask images. The method includes selecting a particular two-mask image with a highest prediction loss from among the set of two-mask images. The method includes generating a training dataset that includes the selected two-mask image. The method includes training the machine learning system using the training dataset.

These and other features, aspects, and advantages of the present invention are discussed in the following detailed description in accordance with the accompanying drawings throughout which like characters represent similar or like parts.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

In general, defenses against patch attacks fall into two categories: empirical and certified defense. Empirical defenses often utilize robust training, which incorporates adversarial inputs generated from specific attacks to improve robustness. However, empirical defenses are susceptible to attacks unseen during training. On the other hand, certified defenses guarantee correct predictions against any adaptive white-box attacker under a given threat model. Hence, the certified robust accuracy is the guaranteed lower bound of the model performance.

Figure 1:
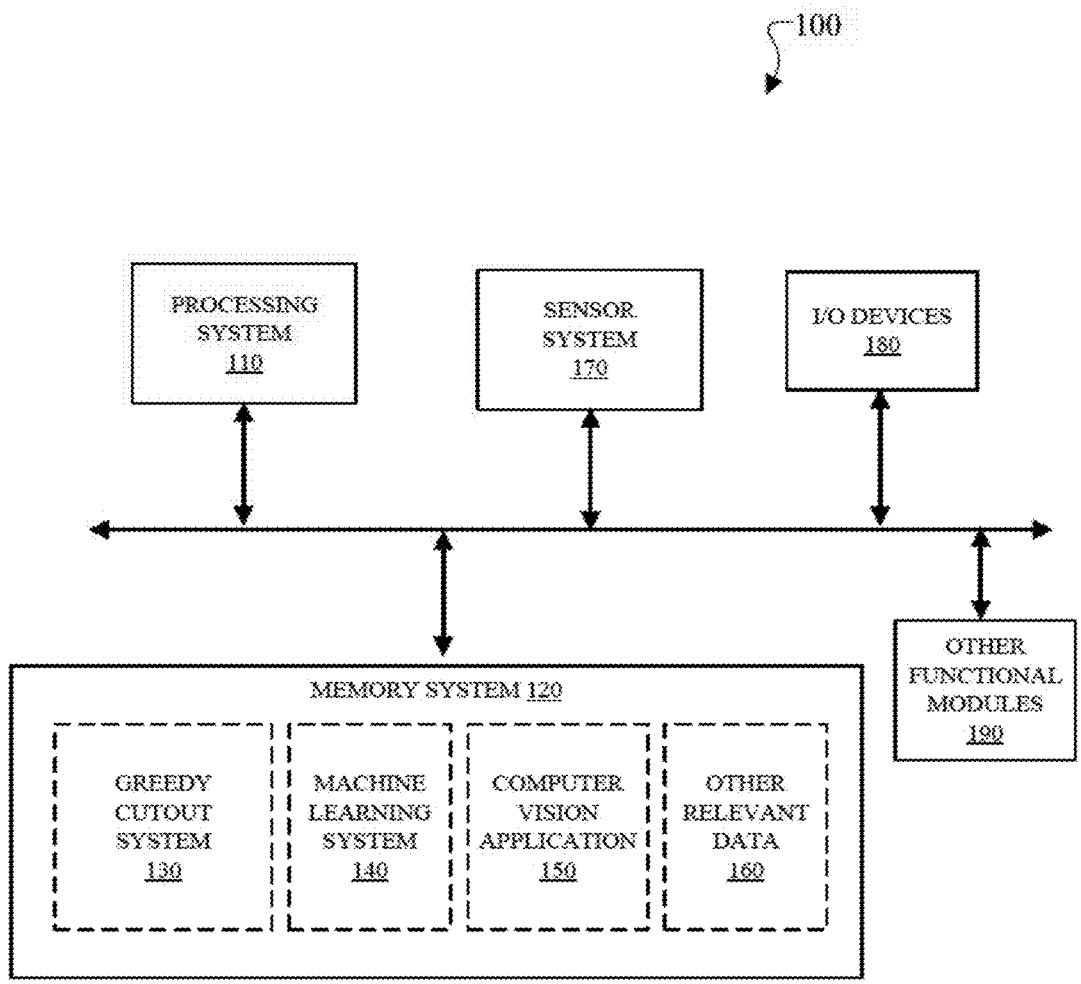
FIG. 1 is a diagram of an example of a system configured to provide certified defenses against adversarial patches according to an example embodiment of this disclosure.

FIG. 1 is a diagram of a non-limiting example of a system 100, which is configured to provide certified defenses against adversarial patch attacks. The system 100 includes a greedy cutout system 130, which is configured to train a machine learning system 140 with worst-case masked images. With the greedy cutout system 130, the system 100 is configured to provide and execute a training strategy, which improves certified robustness over other baselines across different datasets and architectures.

The system 100 includes at least a processing system 110 with one or more processing devices. For example, the processing system 110 includes at least an electronic processor, a central processing unit (CPU), a graphics processing unit (GPU), a microprocessor, a field- programmable gate array (FPGA), an application-specific integrated circuit (ASIC), any suitable processing technology, or any number and combination thereof. The processing system 110 is operable to provide the functionality as described herein.

The system 100 includes a memory system 120, which is operatively connected to the processing system 110. The memory system 120 and the processing system 110 are in data communication with each other. In an example embodiment, the memory system 120 includes at least one non-transitory computer readable storage medium, which is configured to store and provide access to various data to enable at least the processing system 110 to perform the operations and functionality, as disclosed herein. In an example embodiment, the memory system 120 comprises a single memory device or a plurality of memory devices. The memory system 120 may include electrical, electronic, magnetic, optical, semiconductor, electromagnetic, or any suitable storage technology that is operable with the system 100. For instance, in an example embodiment, the memory system 120 may include random access memory (RAM), read only memory (ROM), flash memory, a disk drive, a memory card, an optical storage device, a magnetic storage device, a memory module, any suitable type of memory device, or any number and combination thereof. With respect to the processing system 110 and/or other components of the system 100, the memory system 120 is local, remote, or a combination thereof (e.g., partly local and partly remote). For example, the memory system 120 may include at least a cloud- based storage system (e.g. cloud-based database system), which is remote from the processing system 110 and/or other components of the system 100.

The memory system 120 includes at least a greedy cutout system 130, a machine learning system 140, a computer vision application 150, and other relevant data 160, which are stored thereon. The greedy cutout system 130 includes computer readable data with instructions, which, when executed by the processing system 110, is configured to provide certified robust defenses against adversarial patches and/or defend against patch attacks. The computer readable data may include instructions, code, routines, various machine learning data (e.g., parameter data, loss data, training data, etc.), various related data, any software technology, or any number and combination thereof. Also, the machine learning system 140 includes at least one artificial neural network model and/or any suitable machine learning model, which is configured to perform a classification task. In this regard, for example, the machine learning system 140 includes a classifier (e.g., a convolutional neural network (CNN), ResNet, vision transformer (ViT), or any suitable classification model). The machine learning system 140 may be referred to as model $\mathbb{F}$. Also, the computer vision application 150 is configured to apply the output (e.g., class data) of the machine learning system 140 to computer vision technology and/or provide seamless integration of the greedy cutout system 130 and the machine learning system 140 to a downstream application. Meanwhile, the other relevant data 160 provides various data (e.g. operating system, etc.), which enables the system 100 to perform the functions as discussed herein.

The system 100 is configured to include at least one sensor system 170. The sensor system 170 includes one or more sensors. For example, the sensor system 170 includes an image sensor, a camera, a radar sensor, a light detection and ranging (LIDAR) sensor, a thermal sensor, an ultrasonic sensor, an infrared sensor, a motion sensor, an audio sensor (e.g., microphone), any suitable sensor, or any number and combination thereof. The sensor system 170 is operable to communicate with one or more other components (e.g., processing system 110 and memory system 120) of the system 100. For example, the sensor system 170 may provide sensor data, which is then used by the processing system 110 to generate digital image data based on the sensor data. In this regard, the processing system 110 is configured to obtain the sensor data as digital image data directly or indirectly from one or more sensors of the sensor system 170. The sensor system 170 is local, remote, or a combination thereof (e.g., partly local and partly remote). Upon receiving the sensor data, the processing system 110 is configured to process this sensor data (e.g. image data) in connection with the greedy cutout system 130, the machine learning system 140, the computer vision application 150, the other relevant data 160, or any number and combination thereof.

In addition, the system 100 may include at least one other component. For example, as shown in FIG. 1, the memory system 120 is also configured to store other relevant data 160, which relates to operation of the system 100 in relation to one or more components (e.g., sensor system 170, I/O devices 180, and other functional modules 190). In addition, the system 100 is configured to include one or more DO devices 180 (e.g., display device, keyboard device, speaker device, etc.), which relate to the system 100. Also, the system 100 includes other functional modules 190, such as any appropriate hardware, software, or combination thereof that assist with or contribute to the functioning of the system 100. For example, the other functional modules 190 include communication technology (e.g. wired communication technology, wireless communication technology, or a combination thereof) that enables components of the system 100 to communicate with each other as described herein. In this regard, the system 100 is operable to execute the greedy cutout system 130 to defend against adversarial patch attacks with respect to the machine learning system 140, as described herein.

Figure 2A:
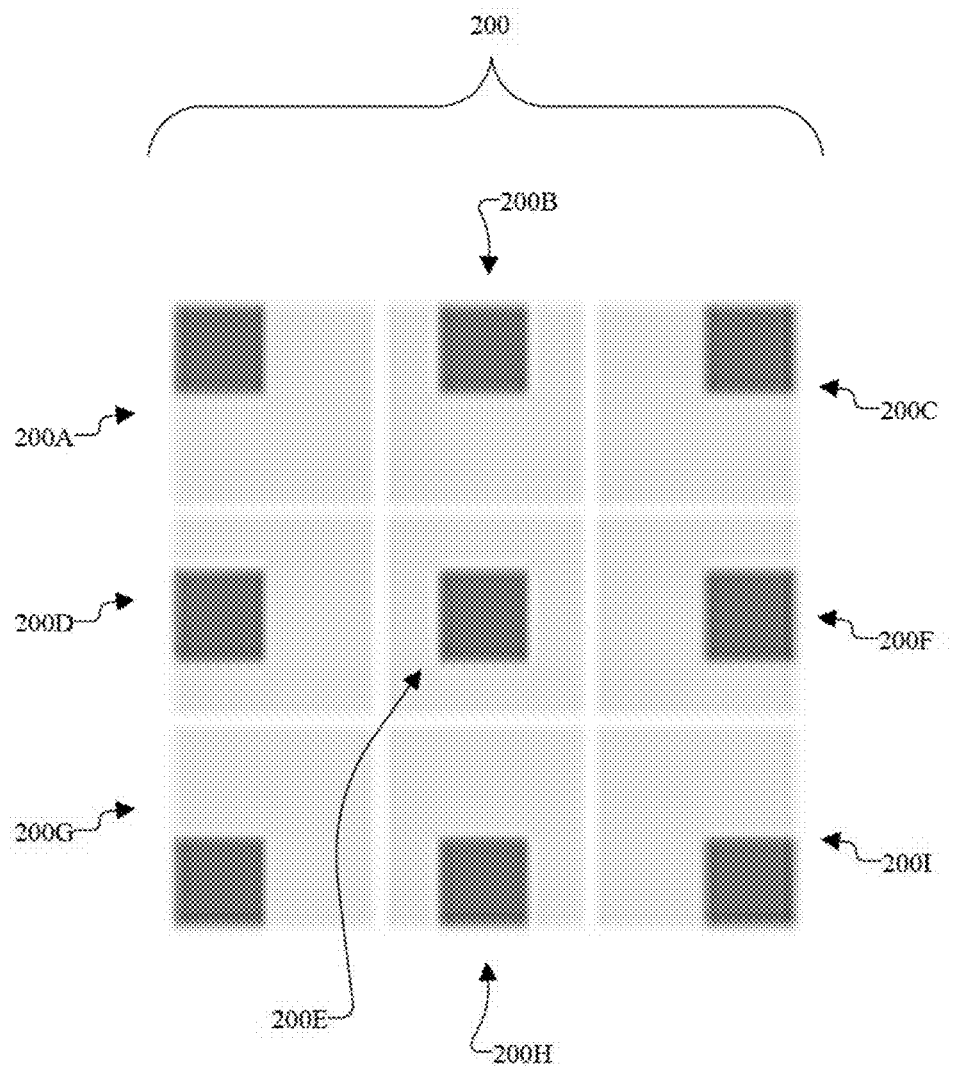
FIG. 2A is a diagram that shows an example of a set of one-mask images to illustrate each of the predetermined locations of a mask with respect to the source image according to an example embodiment of this disclosure.
Figure 2B:
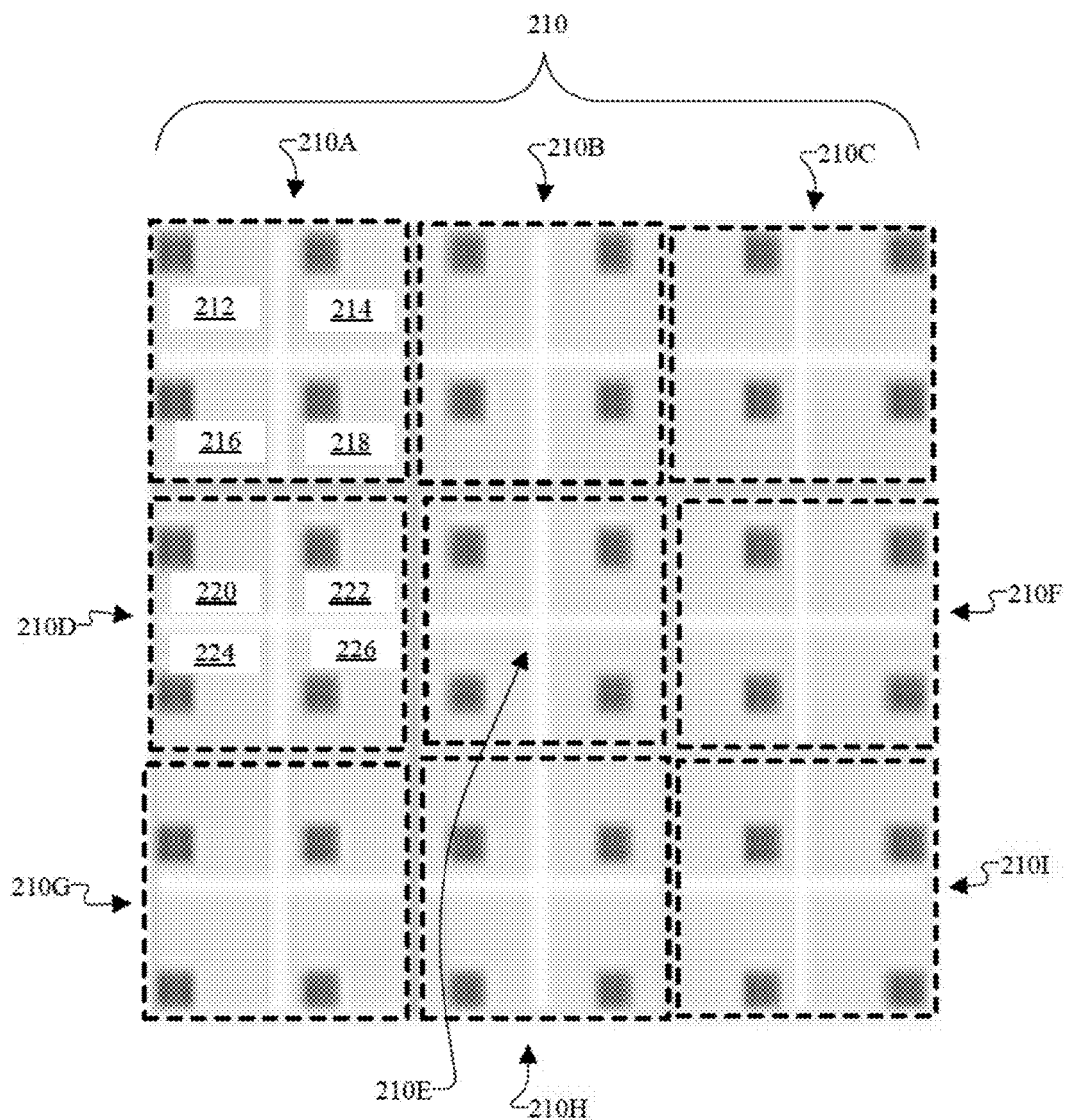
FIG. 2B is a diagram that shows another example of a set of one-mask images to illustrate each of the predetermined locations of a mask with respect to the source image according to an example embodiment of this disclosure.
Figure 2B:
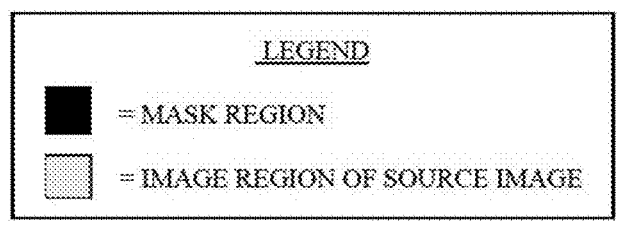

FIG. 2A and FIG. 2B illustrate two different examples of sets of one-mask images to illustrate each of the predetermined locations of a mask with respect to the source image according to an example embodiment. In FIG. 2A and FIG. 2B, the light gray portions represent image regions and dark gray portions represent mask regions, as indicated by the legend. As shown in FIG. 2A and FIG. 2B, the mask regions collectively satisfy the R-covering property, i.e., for any adversarial patch, there exists at least one mask within the mask set that would completely cover the adversarial patch. In this regard, the system 100 uses datasets, which include at least source images. For instance, regarding datasets of high-resolution images such as ImageNet and ImageNette, the greedy cutout system 130 resizes and crops the images to 224×224 before feeding them into the machine learning system 140, which includes model $\mathbb{F}$. For datasets with images with low resolution such as CIFAR-10, the greedy cutout system 130 resizes them to 224×224 via bicubic interpolation for a better classification performance. Although the greedy cutout system 130 uses source images, which are "clean" images (e.g. digital images without adversarial pixels), the greedy cutout system 130 is configured to consider a single adversarial square patch applied on a digital image to be a threat. The greedy cutout system 130 provides mask sets (e.g. a mask set $M_{3\times3}$, a mask set $M_{6\times6}$, etc.), which ensure that a putative adversarial patch of an estimated size (e.g. 3% pixels being associated with 39×39 patch) will be covered and therefore neutralized by at least one of the masks (e.g., a mask at one of the predetermined image regions).

To raise the certified robust accuracy, the model $\mathbb{F}$ is configured to be fine-tuned with respect to two-masked images $\{x\odot m_1\odot m_2 | m_1, m_2 \in M\times M\}$ so it is less sensitive to presence of $m \in M$. For this purpose, the greedy cutout system 130 uses augmented training data with (x', y) where x' is obtain from applying masks or combination of masks on x. In this regard, the greedy cutout system 130 develops a systematic approach to find x' that are more empirically effective than other approaches, such as PatchCleanser. The greedy cutout system 130 uses several inference rounds to identify worst-case masks that lead to highest losses (e.g., highest prediction/classification losses). Then, the greedy cutout system 130 applies these worst-case masks to x to obtain augmented data point (x', y) for training the machine learning system 140.

FIG. 2A shows an example of $M_{3\times3}$, which is a set of 3×3 masks with nine masks in total, and where each mask is of size 100×100. Specifically, FIG. 2A illustrates a set 200 of one-mask images. Each one-mask image includes a mask at a different predetermined location of the digital image. For example, the set 200 of one-mask images includes (1) a one-mask image 200A with a mask at a first predetermined image region of the digital image; (2) a one- mask image 200B with a mask at a second predetermined image region of the digital image; (3) a one-mask image 200C with a mask at a third predetermined image region of the digital image; (4) a one-mask image 200D with a mask at a fourth predetermined image region of the digital image; (5) a one-mask image 200E with a mask at a fifth predetermined image region of the digital image; (6) a one-mask image 200F with a mask at a sixth predetermined image region of the digital image; (7) a one-mask image 200G with a mask at a seventh predetermined image region of the digital image; (8) a one-mask image 200H with a mask at an eighth predetermined image region of the digital image; and (9) a one-mask image 200I with a mask at a nineth predetermined image region of the digital image. As shown in FIG. 2A, the set 200 includes a set of mask regions, which collectively cover every pixel of the source image (or the digital image).

FIG. 2B shows an example of $M_{6\times6}$, which is a set of 6×6 masks with thirty-six masks, and every mask is in shape of 69×69. Specifically, FIG. 2B illustrates a set 210 of one-mask images. Each one-mask image includes a mask at a different predetermined location of the digital image. For example, the set 210 of one-mask images comprises (1) a subset 210A that includes four different one-mask images, (2) a subset 210B that inchides four different one-mask images, (3) a subset 210C that includes four different one-mask images, (4) a subset 210D that includes four different one-mask images, (5) a subset 210E that includes four different one-mask images, (6) a subset 210F that includes four different one-mask images, (7) a subset 210G that includes four different one-mask images, (8) a subset 210H that includes four different one-mask images, and (9) a subset 210I that includes four different one-mask images. For convenience, each one-mask image is not labelled with a reference number in FIG. 2B, but only some of the one-mask images are labelled so that the labels may be easily viewed without clutter of other reference labels. For example, the subset 210A is labeled as an illustrative example. For instance, the subset 210A includes (i) a one-mask image 212 with a mask at a predetermined image region of the digital image that corresponds to a first part of the mask of the one-mask image 200A, (ii) a one-mask image 214 with a mask at a predetermined image region of the digital image that corresponds to a second part of the mask of the one-mask image 200A, (ii) a one-mask image 216 with a mask at a predetermined image region of the digital image that corresponds to a third part of the mask region of one-mask image 200A, and (iv) a one-mask image 218 with a mask at a predetermined image region of the digital image that corresponds to a fourth part of the mask region of one-mask image 200A. In this regard, the mask regions of the subset 210A collectively correspond to the single mask region at the first predetermined image region of the one-mask image 200A. Also, as another example, the subset 210D includes (i) a one-mask image 220 with a mask at a predetermined image region of the digital image that corresponds to a first part (upper left portion) of the mask of one-mask image 200D, (ii) a one- mask image 222 with a mask at a predetermined image region of the digital image that corresponds to a second part (upper right portion) of the mask of one-mask image 200D, (iii) a one-mask image 224 with a mask at a predetermined image region of the digital image that corresponds to a third part (lower left portion) of the mask of one-mask image 200D, and (iv) a one-mask image 226 with a mask at a predetermined image region of the digital image that corresponds to a fourth part (lower right portion) of the mask of one-mask image 200D. The mask regions of the subset 210D collectively correspond to the single mask region at the fourth predetermined image region of the one-mask image 200D.

Furthermore, due to the careful choice of $M_{3\times3}$ and $M_{6\times6}$, each mask in $M_{3\times3}$ may be fully covered by a corresponding subset of 4 masks in $M_{6\times6}$. For example, FIG. 2B illustrates that (1) a subset 210A includes four masks in which those four masks correspond to and fully cover a single mask of the one-mask image 200A, (2) a subset 210B includes four masks in which those four masks correspond to and fully cover a single mask of the one-mask image 200B, (3) a subset 210C includes four masks in which those four masks correspond to and fully cover a single mask of the one-mask image 200C, (4) a subset 210D includes four masks in which those four masks correspond to and fully cover a single mask of the one-mask image 200D, (5) a subset 210E includes four masks in which those four masks correspond to and fully cover a single mask of the one-mask image 200E, (6) a subset 210F includes four masks in which those four masks correspond to and fully cover a single mask of the one-mask image 200F, (7) a subset 210G includes four masks in which those four masks correspond to and fully cover a single mask of the one-mask image 200G, (8) a subset 210H includes four masks in which those four masks correspond to and fully cover a single mask of the one-mask image 200H, and (9) a subset 210I includes four masks in which those four masks correspond to and fully cover a single mask of the one-mask image 200I.

Referring to FIG. 2A and FIG. 2B, empirically, $M_{6\times6}$ leads to higher certified robust accuracy since two smaller masks have a smaller effect on the prediction of model $\mathbb{F}$ than the larger masks. However, $M_{6\times6}$ has ≈8 times larger size than $M_{3\times3}$ and requires more computation in both inference and certification. In this regard, the greedy cutout system 130 is configured to strike a delicate trade-off between computational cost and accuracy.

Figure 3:
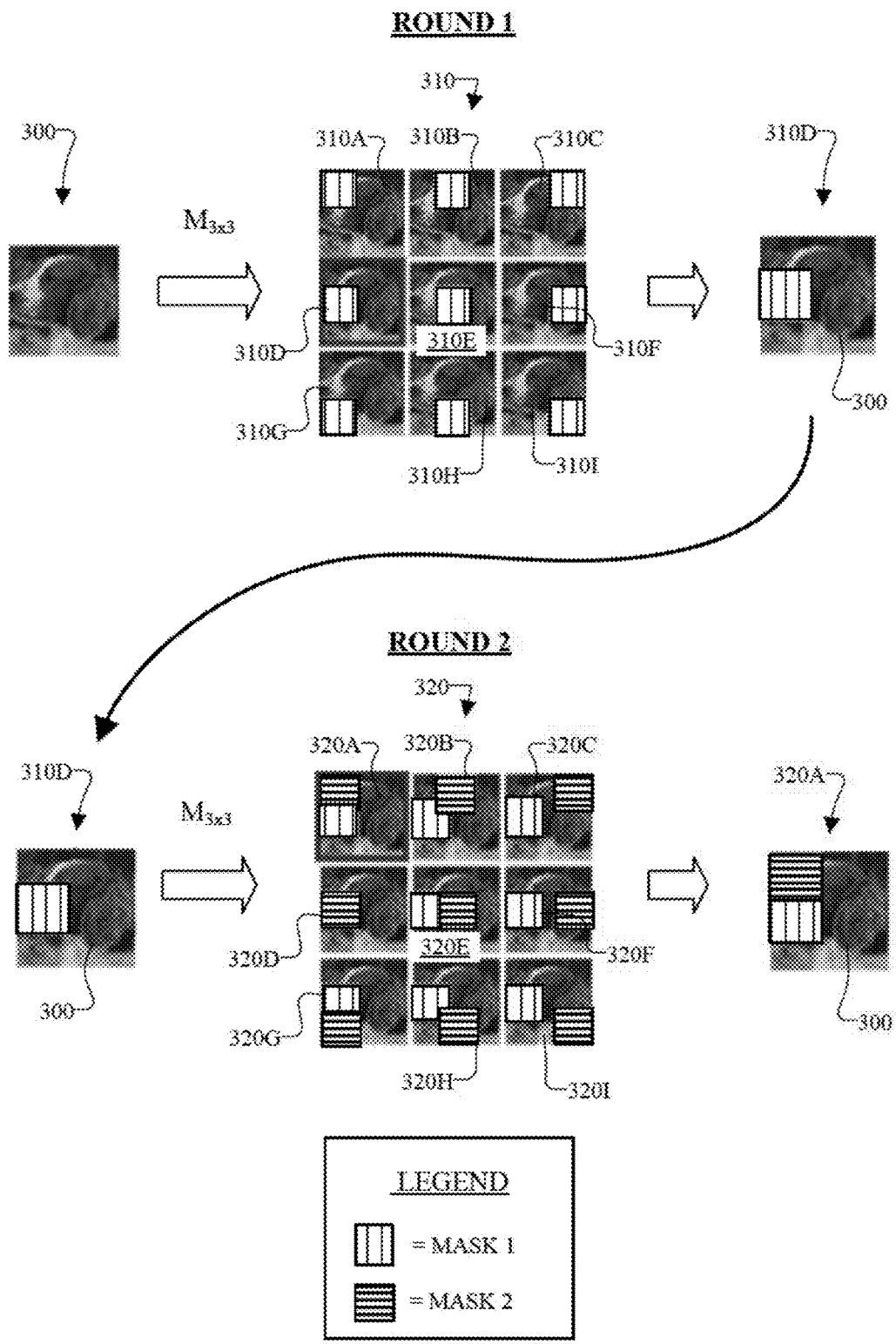
FIG. 3 is a diagram that illustrates aspects of the greedy cutout system using a non- limiting example according to an example embodiment of this disclosure.

FIG. 3 illustrates aspects of the greedy cutout system 130 via a non-limiting example according to an example embodiment. As aforementioned, the greedy cutout system 130 may be executed by one or more processors of the processing system 110. The greedy cutout system 130 first defines the prediction loss of the model $\mathbb{F}$ on image label pair (x, y). For example, suppose within the model $\mathbb{F}$, for each label y'∈ Y, the confidence level for model $\mathbb{F}$ to predict y' is $p_{y'}$, then the greedy cutout system 130 uses the cross entropy loss $\ell(\mathbb{F}(x, y))=-\Sigma_{y\in Y}c_{y'}\log p_{y'}$, where $c_{y'}=1$ for y'=y otherwise $c_{y'}=0$. For mask set $M_{k\times k}$ (k=3 or k=6), the greedy cutout system 130 is configured to identify the worst-case mask combination $m_1$, $m_2 \in M_{k\times k}\times M_{k\times k}$ that incurs the largest loss $\ell(\mathbb{F}(x\odot m_1\odot m_2), y)$ with grid search, but inferencing over all $$\binom{k^2}{2}+k^2$$

(45 when k=3, and 666 when k=6) unique combinations would be computationally prohibitive, thereby motivating the strategy of the greedy cutout system 130.

The greedy cutout system 130 finds the worst-case mask in each individual masking round. For example, in the first round, for each $m_1 \in M_{k\times k}$, the greedy cutout system 130 computes the loss $\ell((\mathbb{F}x\odot m_1), y)$, and denotes the mask incurring the highest loss as $m_1^*$. Then, in the second round, for each $m_2 \in M_{k\times k}$; $m_2 \neq m_1$, the greedy cutout system 130 computes the loss $\ell(\mathbb{F}(x\odot m_1^* \odot m_2), y))$, and finds the $m_2^*$ with the highest loss. Then, the greedy cutout system 130 empirically uses $M_2:=m_1^*\odot m_2^*$ as the worst-case mask combination. Although $M_2$ may not be the exact worst-case mask, $(x\odot M_2, y)$ still provides a guidance for fine-tuning. More importantly, the greedy cutout system 130 significantly reduces the inference burden down to $2k^2-1$ (17, k=3, k=6) compared to grid search. Also, for k=6, although the computation cost is high, the mask set $M_{6\times6}$ has better accuracy over the mask set $M_{3\times3}$.

Referring to FIG. 3, as a non-limiting example, in a first round (or "round 1") of masking, the greedy cutout system 130 applies a mask set to a source image 300. For example, the mask set may be a mask set $M_{3\times3}$ (FIG. 2A), a mask set $M_{6\times6}$ (FIG. 2B), etc. The source image 300 is a digital image. The source image 300 is a clean image (or an image without any adversarial pixels/patches). For instance, in FIG. 3, when applying $M_{3\times3}$ as the mask set to the source image 300, the greedy cutout system 130 generates a set 310 of one-mask images using the source image 300 and a first mask at a set of predetermined image regions of the source image 300. For example, as shown in FIG. 3, the set 310 of one-mask images include nine one-mask images, which include (1) a one-mask image 310A with a first mask at a first predetermined image region of the source image 300, (2) a one-mask image 310B with the first mask at a second predetermined image region of the source image 300, (3) a one-mask image 310C with the first mask at a third predetermined image region of the source image 300, (4) a one-mask image 310D with the first mask at a fourth predetermined image region of the source image 300, (5) a one- mask image 310E with the first mask at a fifth predetermined image region of the source image 300, (6) a one-mask image 310F with the first mask at a sixth predetermined image region of the source image 300, (7) a one-mask image 310G with the first mask at a seventh predetermined image region of the source image 300, (8) a one-mask image 310H with the first mask at an eighth predetermined image region of the source image 300, (9) a one-mask image 310I with the first mask at a ninth predetermined image region of the source image 300.

As shown in FIG. 3, the first mask (aka "mask 1") covers every pixel of the source image 300 across the set 310 of one-mask images. For example, when the first mask is located at a first predetermined image region of the source image 300, the first mask covers a left section of an upper row (e.g., left top corner) of the source image 300, as shown by the one-mask image 310A. When the first mask is located at a second predetermined image region of the source image 300, the first mask covers a center section of an upper row of the source image 300, as shown by the one-mask image 310B. When the first mask is located at a third predetermined image region of the source image 300, the first mask covers a right section of an upper row (e.g., right top corner) of the source image 300, as shown by the one-mask image 310C. When the first mask is located at a fourth predetermined image region of the source image 300, the first mask covers a left section of a middle row of the source image 300, as shown by the one-mask image 310D. When the first mask is located at a fifth predetermined image region of the source image 300, the first mask covers a center section of a middle row of the source image 300, as shown by the one-mask image 310E. When the first mask is located at a sixth predetermined image region of the source image 300, the first mask covers a right section of a middle row of the source image 300, as shown by the one-mask image 310F. When the first mask is located at a seventh predetermined image region of the source image 300, the first mask covers a left section of a lower row (e.g., left bottom corner) of the source image 300, as shown by the one-mask image 310G. When the first mask is located at an eighth predetermined image region of the source image 300, the first mask covers a center section of a lower row of the source image 300, as shown by the one-mask image 310H. When the first mask is located at a ninth predetermined image region of the source image 300, the first mask covers a right section of a lower row (e.g., bottom right corner) of the source image 300, as shown by the one-mask image 310I.

As discussed earlier, upon generating the set 310 of one-mask images, the greedy cutout system 130 computes the loss $\ell ((\mathbb{F} \times \odot m_1), y)$, and denotes the mask incurring the highest loss as $m_1^*$. In the non-limiting example of FIG. 3, for instance, the greedy cutout system 130 generates prediction data indicating that the highest loss is associated with the one-mask image 310D with the first mask at a fourth predetermined image region of the source image 300. The greedy cutout system 130 selects the one-mask image (e.g., one-mask image 310D) that incurs the highest classification loss from among the set 310 of one-mask images. The greedy cutout system 130 then uses only the selected one-mask image 310D in a second round ("round 2") of masking.

In the second round of masking, the greedy cutout system 130 applies a second mask of a same type of mask set (e.g., $M_{3\times3}$, $M_{6\times6}$, etc.) to the selected one-mask image 310D. In this example, a mask region of the first mask is equivalent or similar to a mask region of the second mask. In FIG. 3, for instance, the mask set $M_{3\times3}$ is applied in the first round of masking and the second round of masking. In the second round, upon applying $M_{3\times3}$ as the mask set to the selected one-mask image 310D, the greedy cutout system 130 generates a set 320 of two-mask images with (i) the first mask being fixed at its predetermined location of the source image 300 and (ii) the second mask being at a set of predetermined locations of the source image 300. For example, as shown in FIG. 3, the set 320 of two-mask images include nine two-mask images, which include (1) a two-mask image 320A with the second mask at a first predetermined image region of the selected one-mask image 310D, (2) a two-mask image 320B with the second mask at a second predetermined image region of the selected one-mask image 310D, (3) a two-mask image 320C with the second mask at a third predetermined image region of the selected one-mask image 310D, (4) a two-mask image 320D with the second mask at a fourth predetermined image region of the selected one-mask image 310D, (5) a two-mask image 320E with the second mask at a fifth predetermined image region of the selected one-mask image 310D, (6) a two-mask image 320F with the second mask at a sixth predetermined image region of the selected one-mask image 310D, (7) a two-mask image 320G with the second mask at a seventh predetermined image region of the selected one-mask image 310D, (8) a two-mask image 320H with the second mask at an eighth predetermined image region of the selected one-mask image 310D, (9) a two-mask image 320I with the second mask at a ninth predetermined image region of the selected one-mask image 310D.

As shown in FIG. 3, the second mask covers every pixel of the source image 300 across the set 320 of two-mask images. For example, when the second mask is located at a first predetermined image region of the selected one-mask image 310D, the second mask covers a left section of an upper row (e.g. top left corner) of the source image 300, as shown by the two-mask image 320A. When the second mask is located at a second predetermined image region of the selected one-mask image 310D, the second mask covers a center section of an upper row of the source image 300, as shown by the two-mask image 320B. When the second mask is located at a third predetermined image region of the selected one-mask image 310D, the second mask covers a right section of an upper row (e.g., top right corner) of the source image 300, as shown by the two-mask image 320C. When the second mask is located at a fourth predetermined image region of the selected one-mask image 310D, the second mask covers a left section of a middle row of the source image 300, as shown by the two-mask image 320D. Moreover, as shown in FIG. 3, the two-mask image 320D illustrates a case in which the first mask and the second mask overlap each other and cover the same fourth predetermined image region. When the second mask is located at a fifth predetermined image region of the selected one-mask image 310D, the second mask covers a center section of a middle row of the source image 300, as shown by the two- mask image 320E. When the second mask is located at a sixth predetermined image region of the selected one-mask image 310D, the second mask covers a right section of a middle row of the source image 300, as shown by the two-mask image 320F. When the second mask is located at a seventh predetermined image region of the selected one-mask image 310D, the second mask covers a left section of a lower row (e.g., bottom left corner) of the source image 300, as shown by the two-mask image 320G. When the second mask is located at an eighth predetermined image region of the selected one-mask image 310D, the second mask covers a center section of a lower row of the source image 300, as shown by the two-mask image 320H. When the second mask is located at a ninth predetermined image region of the selected one-mask image 310D, the second mask covers a right section of a lower row (e.g., a bottom right corner) of the source image 300, as shown by the two-mask image 320I.

As discussed earlier, upon generating the set 320 of two-mask images, the greedy cutout system 130 computes the loss $\ell\,(\mathbb{F}\,(x\odot m_1{}^*\odot m_2),\,y))$, and finds the $m_2{}^*$ with the highest loss. Then, the greedy cutout system 130 empirically uses $M_2:=m_1{}^*\odot m_2{}^*$ as the worst-case mask combination. In the non-limiting example of FIG. 3, for instance, the greedy cutout system 130 generates prediction data indicating that the highest loss is associated with the two-mask image 320A with the second mask at a first predetermined image region of the selected one-mask image 310D. The greedy cutout system 130 selects the two-mask image (e.g., two-mask image 320A) that incurs the highest classification loss from among the set 320 of two-mask images. The greedy cutout system 130 then uses only (i) each source image and (ii) each selected two- mask image 320A in a training dataset. In this regard, the machine learning system 140 is therefore trained on this training dataset, which includes only (i) source images 300 and (ii) worst case two-mask images 320A (e.g., two-mask images with highest classification losses from first and second rounds of masking).

Figure 4:
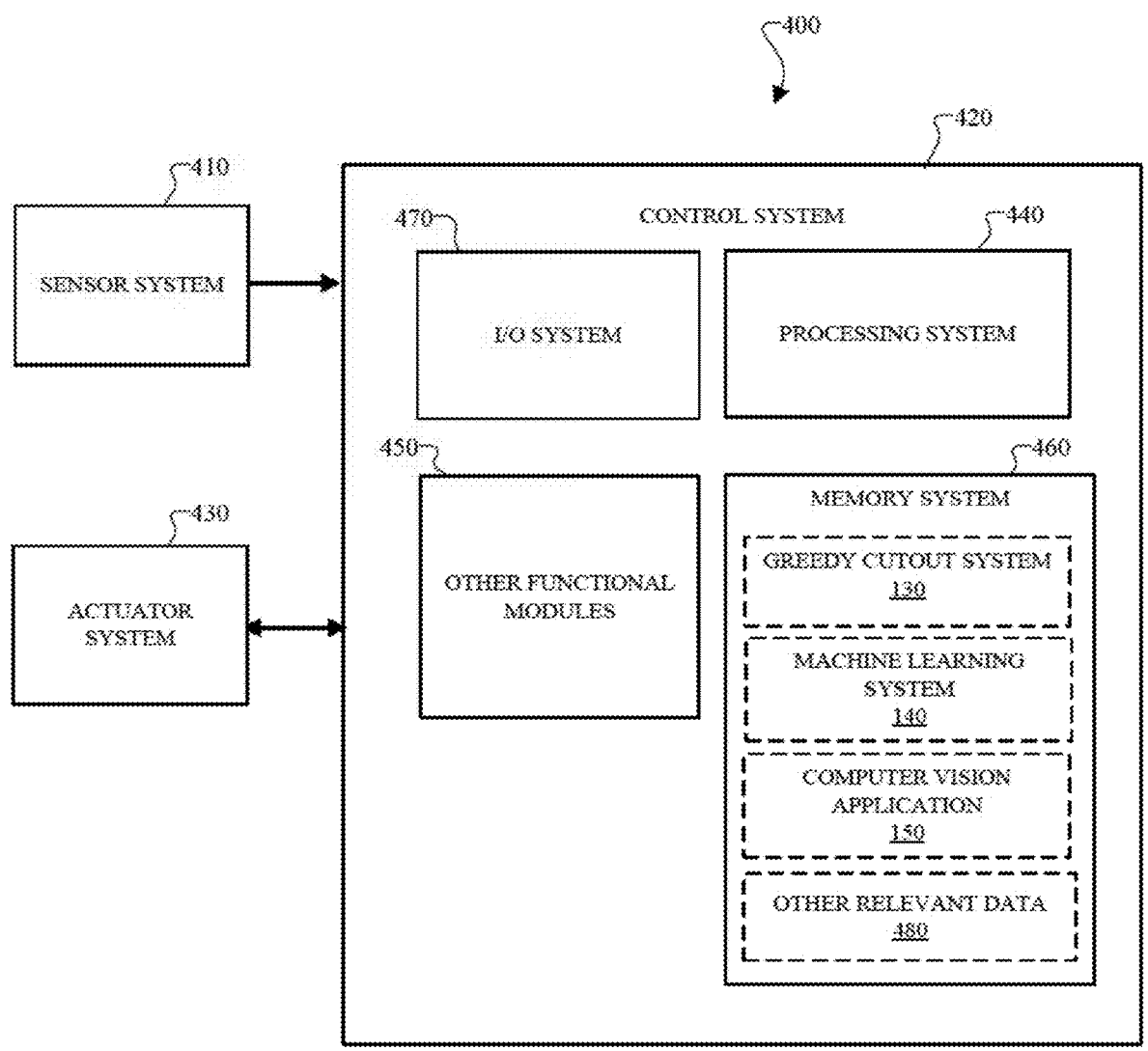
FIG. 4 is a diagram of an example of another system that is configured to provide certified defenses against adversarial patches and defend against adversarial patch attacks according to an example embodiment of this disclosure.

FIG. 4 is a diagram of a system 400, which includes the greedy cutout system 130. The system 400 is configured to also include at least a sensor system 410, a control system 420, and an actuator system 430. The system 400 is configured such that the control system 420 controls the actuator system 430 based on sensor data from the sensor system 410. More specifically, the sensor system 410 includes one or more sensors and/or corresponding devices to generate sensor data. For example, the sensor system 410 includes an image sensor, a camera, a radar sensor, a light detection and ranging (LIDAR) sensor, a thermal sensor, an ultrasonic sensor, an infrared sensor, a motion sensor, a satellite-based navigation sensor (e.g., Global Positioning System (GPS) sensor), an optical sensor, an audio sensor, any suitable sensor, or any number and combination thereof. Upon obtaining detections from the environment, the sensor system 410 is operable to communicate with the control system 420 via an input/output (I/O) system 470 and/or other functional modules 450, which includes communication technology.

The control system 420 is configured to obtain the sensor data directly or indirectly from one or more sensors of the sensor system 410. In this regard, the sensor data may include sensor data from a single sensor or sensor-fusion data from a plurality of sensors. Upon receiving input, which includes at least sensor data, the control system 420 is operable to process the sensor data via the processing system 440. In this regard, the processing system 440 includes at least one processor. For example, the processing system 440 includes an electronic processor, a central processing unit (CPU), a graphics processing unit (GPU), a microprocessor, a field- programmable gate array (FPGA), an application-specific integrated circuit (ASIC), processing circuits, any suitable processing technology, or any combination thereof. Upon processing at least this sensor data, the processing system 440 is configured to extract, generate, and/or obtain proper input data (e.g., digital image data) for the greedy cutout system 130. In addition, the processing system 440 is operable to generate output data (e.g., class data) via the greedy cutout system 130 and the machine learning system 140 based on communications with the memory system 460. In addition, the processing system 440 is operable to provide actuator control data to the actuator system 430 based on the output data (e.g., class data), which is generated via the greedy cutout system 130 and the machine learning system 140.

The memory system 460 is a computer or electronic storage system, which is configured to store and provide access to various data to enable at least the operations and functionality, as disclosed herein. The memory system 460 comprises a single device or a plurality of devices. The memory system 460 includes electrical, electronic, magnetic, optical, semiconductor, electromagnetic, any suitable memory technology, or any combination thereof. For instance, the memory system 460 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 420 and/or processing system 440, the memory system 460 is local, remote, or a combination thereof (e.g., partly local and partly remote). For example, the memory system 460 may include at least a cloud-based storage system (e.g., cloud-based database system), which is remote from the processing system 440 and/or other components of the control system 420.

The memory system 460 includes at least the greedy cutout system 130, which is executed via the processing system 440. The greedy cutout system 130 is configured to receive or obtain input data, which includes at least one digital image. In this regard, the greedy cutout system 130, via the machine learning system 140 and the processing system 440, is configured to generate output data (e.g., a set of class data) based on the input data (e.g., one or more digital images). The machine learning system 140 includes at least one artificial neural network model and/or any suitable machine learning model, which is configured to perform a classification task. In this regard, for example, the machine learning system 140 includes a classifier (e.g., a convolutional neural network (CNN), ResNet, vision transformer (ViT), or any suitable classification model). The machine learning system 140 may be referred to as model $\mathbb{F}$. In this regard, the greedy cutout system 130 is advantageously configured to implement a first round of masking to generate one-mask images for the digital image. These one-mask images are then input to the machine learning system 140 to generate class data for that digital image by using a majority prediction and disagreer prediction technique similarly to PatchCleanser. In addition, if deemed necessary, the greedy cutout system 130 is configured to implement a second round of masking to generate two-mask images based on each disagreeing one-mask image of the first round of masking. These two-mask images are then input to the machine learning system 140 to generate class data for the digital image by using a majority prediction and disagreer prediction technique similarly to PatchCleanser. Also, the memory system 460 includes the computer vision application 150, which is configured to apply the output (e.g., class data) of the machine learning system 140 to computer vision technology and/or provide seamless integration of the greedy cutout system 130 and the machine learning system 140 to a downstream application. Meanwhile, the other relevant data 480 provides various data (e.g. operating system, etc.), which enables the system 400 to perform the functions as discussed herein.

Furthermore, as shown in FIG. 4, the system 400 includes other components that contribute to operation of the control system 420 in relation to the sensor system 410 and the actuator system 430. For example, as shown in FIG. 4, the memory system 460 is also configured to store other relevant data 480, which relates to the operation of the system 400 in relation to one or more components (e.g., sensor system 410, the actuator system 430, etc.). Also, as shown in FIG. 4, the control system 420 includes the I/O system 470, which includes one or more interfaces for one or more I/O devices that relate to the system 400. For example, the I/O system 470 provides at least one interface to the sensor system 410 and at least one interface to the actuator system 430. Also, the control system 420 is configured to provide other functional modules 450, such as any appropriate hardware technology, software technology, or any combination thereof that assist with and/or contribute to the functioning of the system 400. For example, the other functional modules 450 include an operating system and communication technology that enables components of the system 400 to communicate with each other as described herein. With at least the configuration discussed in the example of FIG. 4, the system 400 is applicable in various technologies.

Figure 5:
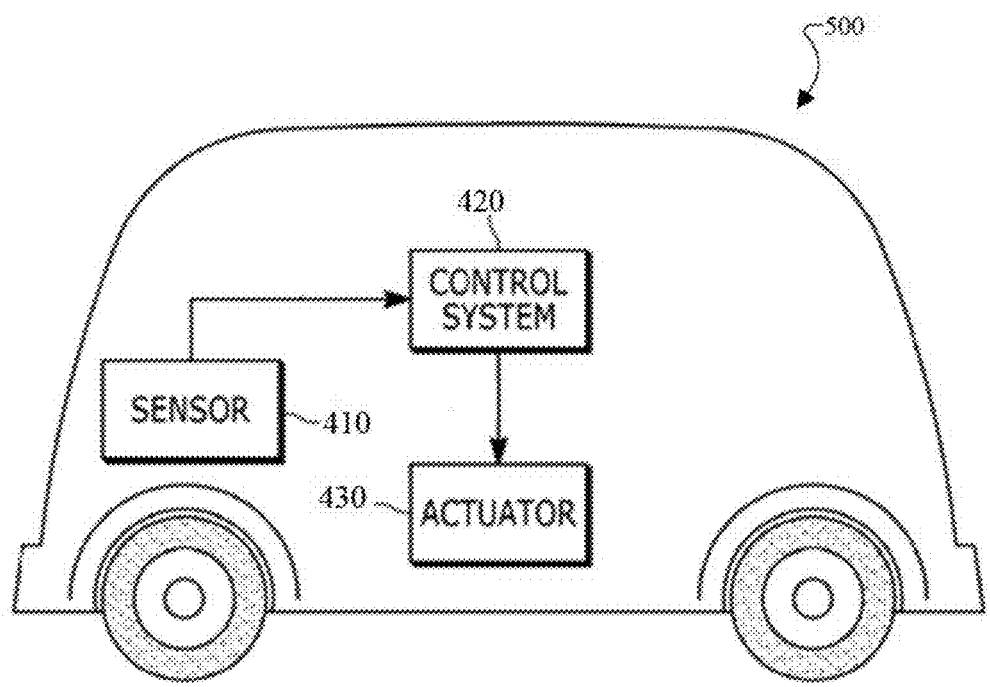
FIG. 5 is a diagram of the system of FIG. 4 with respect to mobile machine technology according to an example embodiment of this disclosure.

FIG. 5 is a diagram of the system 400 with respect to mobile machine technology 500 according to an example embodiment. As a non-limiting example, the mobile machine technology 500 includes at least a partially autonomous vehicle or robot. In FIG. 5, the mobile machine technology 500 is at least a partially autonomous vehicle, which includes a sensor system 410. The sensor system 410 includes an optical sensor, an image sensor, a video sensor, an ultrasonic sensor, a position sensor (e.g. GPS sensor), a radar sensor, a LIDAR sensor, any suitable sensor, or any number and combination thereof. One or more of the sensors may be integrated with respect to the vehicle. The sensor system 410 is configured to provide sensor data to the control system 420.

The control system 420 is configured to obtain image data, which is based on sensor data or sensor-fusion data from the sensor system 410. In addition, the control system 420 is configured to pre-process the sensor data to provide input data of a suitable form (e.g., digital image data) to the greedy cutout system 130 and the machine learning system 140. With the guidance of the greedy cutout system 130, the machine learning system 140 generates class data as output upon receiving a given digital image as input with certified robust defenses against adversarial patches.

Upon receiving class data from the machine learning system 140, the greedy cutout system 130, and/or the computer vision application 150, the control system 420 is configured to generate actuator control data based on the class data, which classifies a digital image and/or classifies a target subject of the digital image. With the inclusion of the machine learning system 140 and the greedy cutout system 130, the control system 420 is configured to generate actuator control data that allows for safer and more accurate control of the actuator system 430 of the vehicle as the greedy cutout system 130 provides the trained machine learning system 140 with certified robust defenses against adversarial patches. The actuator system 430 may include a braking system, a propulsion system, an engine, a drivetrain, a steering system, or any number and combination of actuators of the vehicle. The actuator system 430 is configured to control the vehicle so that the vehicle follows rules of the roads and avoids collisions based at least on the class data that is provided by the machine learning system 140 via the guidance of the greedy cutout system 130.

Figure 6:
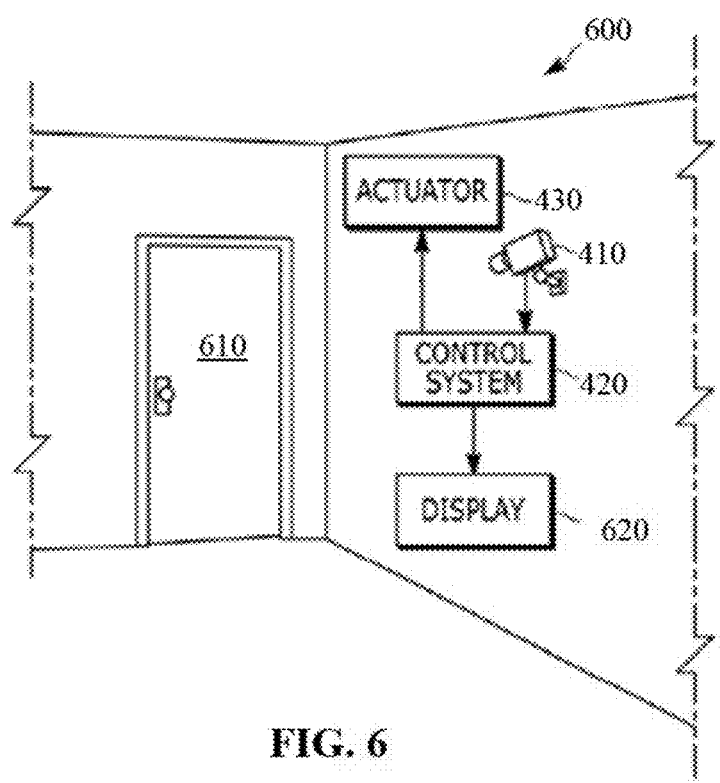
FIG. 6 is a diagram of the system of FIG. 4 with respect to security technology according to an example embodiment of this disclosure.

FIG. 6 is a diagram of the system 400 with respect to security technology 600 according to an example embodiment. As a non-limiting example, the security technology 600 includes at least a monitoring system, a control access system, a surveillance system, or any suitable type of security apparatus. For instance, as one example, FIG. 6 relates to security technology 600, which is configured to physically control a locked state and an unlocked state of a lock of the door 610 and display an enhanced image/video on the display 620. The sensor system 410 includes at least an image sensor that is configured to provide image/video data.

The control system 420 is configured to obtain the image/video data from the sensor system 410. The control system 420 is also configured to generate class data that classifies digital images via the machine learning system 140 with certified robustness against adversarial patches via the greedy cutout system 130. In addition, the control system 420 is configured to generate actuator control data that allows for safer and more accurate control of the actuator system 430 by using class data, which is generated by the greedy cutout system 130 and the machine learning system 140. The control system 420 is configured to display the source image, the class data of the machine learning system 140, any data relating to the greedy cutout system 130 and/or the machine learning system 140, any data relating to the computer vision application 150, or any number and combination thereof on the display 620.

Figure 7:
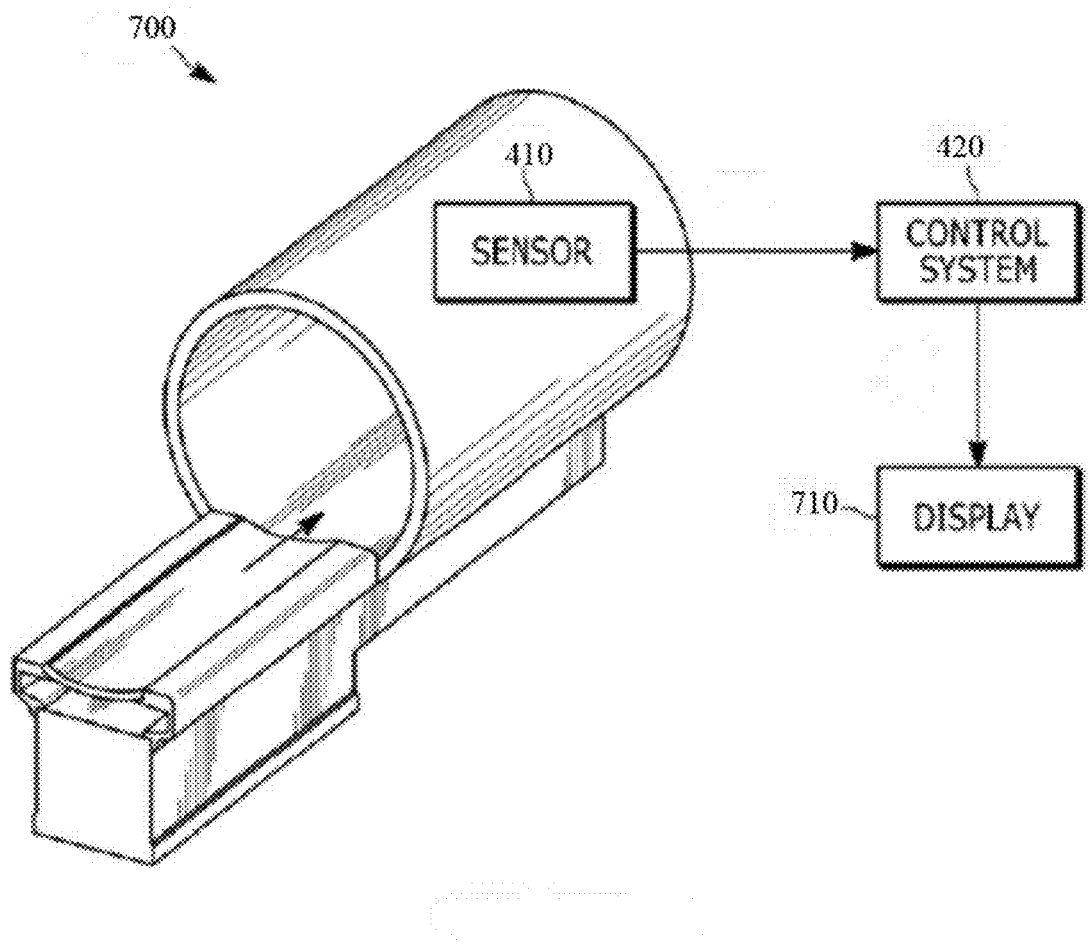
FIG. 7 is a diagram of the system of FIG. 4 with respect to imaging technology according to an example embodiment of this disclosure.

FIG. 7 is a diagram of the system 400 with respect to imaging technology 700 according to an example embodiment. As a non-limiting example, the imaging technology 700 includes a magnetic resonance imaging (MRI) apparatus, an x-ray imaging apparatus, an ultrasonic apparatus, a medical imaging apparatus, or any suitable type of imaging apparatus. In FIG. 7, the sensor system 410 includes at least one imaging sensor. The control system 420 is configured to obtain image data from the sensor system 410. The control system 420 is also configured to generate class data that classifies the image data via the machine learning system 140 with certified robustness against adversarial patches via the greedy cutout system 130. In addition, the control system 420 is configured to provide more accurate medical information by using the class data, which is generated via the greedy cutout system 130 and the machine learning system 140. In addition, the control system 420 is configured to display the any relevant data (e.g., any data relating to the greedy cutout system 130, the machine learning system 140, the computer vision application 150, or any number and combination thereof) on the display 710.

As described in this disclosure, the embodiments provide several advantages and benefits. For example, the greedy cutout system 130 recognizes that training a classifier with standard cutout augmentation is not entirely effective for all two-masked images. Therefore, the greedy cutout system 130 considers the invariance of image classifiers to pixel masking with an objective to improve PatchCleanser certification. For example, in contrast to PatchCleanser, which uses Random Cutout augmentation, i.e., applying two masks of size 128×128 at random locations to 224×224 training images, the greedy cutout system 130 develops a systematic approach to find x' that are more empirically effective. In this regard, the greedy cutout system 130 provides a strategy to train the classifier with worst-case masked images. When compared with various other masking strategies (e.g., Random Cutout, Gutout or Cutout guided by Grad-CAM, Cutout with exhaustive search, etc.), the greedy cutout system 130 has a training strategy, which improves certified robustness over other baselines across different datasets and architectures.

Figure 8A:
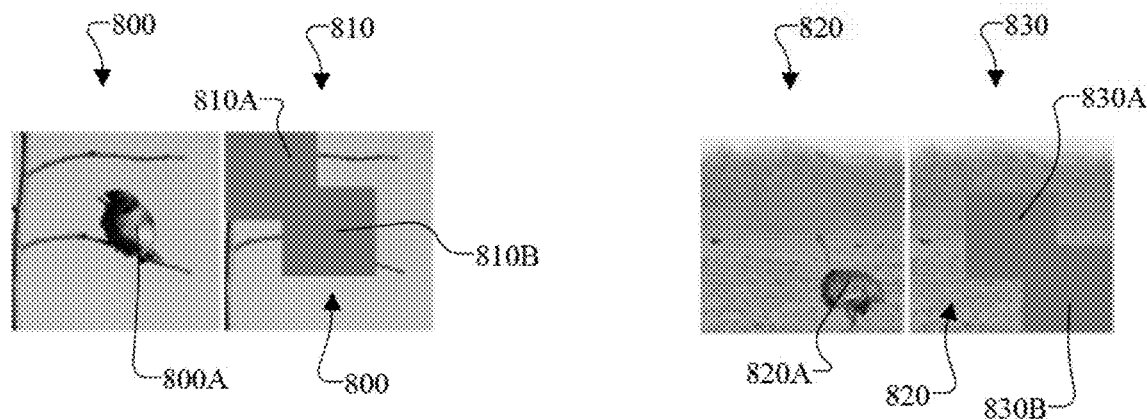
FIG. 8A illustrates non-limiting reference examples of digital images in which mask portions fully occlude the object of interest according to an example embodiment of this disclosure.
Figure 8B:
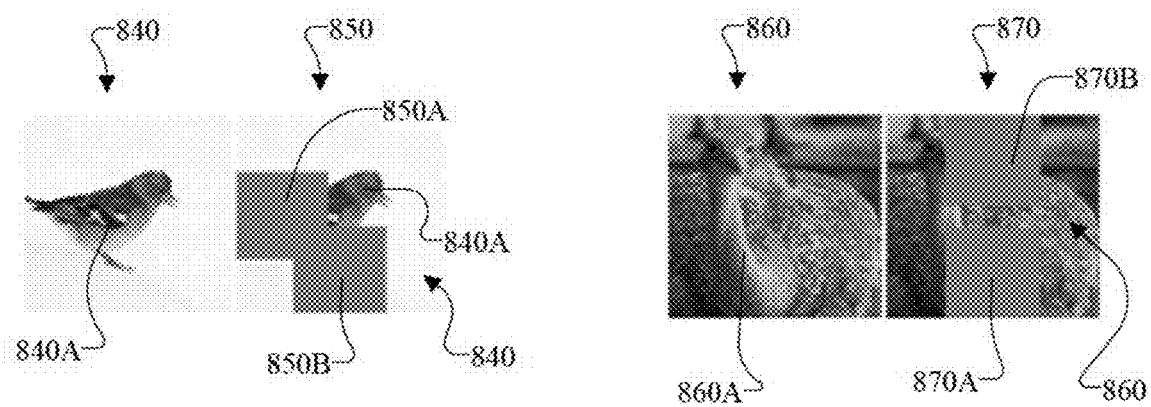
FIG. 8B illustrates non-limiting reference examples of digital images in which mask portions partially occlude the object of interest according to an example embodiment of this disclosure.

FIG. 8A and FIG. 8B illustrate some reference examples to show some issues associated with classifying some masked versions of images while also further explaining advantages of the greedy cutout system 130 over random cutout augmentation (e.g., PatchCleanser). Specifically, FIG. 8A illustrates an example of a digital image 800 that displays a bird 800A on a branch of a tree. In addition, FIG. 8A illustrates a digital image 810, which shows a masked version of the digital image 800 in which a mask portion 810A and another mask portion 810B completely occlude the object of interest (i.e., the bird 800A). As another example, FIG. 8A also shows a digital image 820 that displays an ostrich 820A on land. In addition, FIG. 8A illustrate a digital image 810, which shows a masked version of the digital image 820 in which a mask portion 810A and another mask portion 810B completely occlude the object of interest (i.e., the ostrich 820A). Regarding digital image 810 and digital image 830, certification is not possible because the mask portions completely occlude the object of interest (e.g., bird 800A in digital image 810 and ostrich 820A in digital image 830).

Meanwhile, FIG. 8B illustrates a digital image 840 that displays a side view of a bird 840A and a digital image 860 that displays a front view of a face of an ostrich 860A. In addition, FIG. 8B illustrates a digital image 850, which shows a masked version of the digital image 840 in which a mask portion 850A and another mask portion 850B partially occlude the object of interest (i.e., the bird 840A). Also, FIG. 8B illustrates a digital image 870, which shows a masked version of the digital image 860 in which a mask portion 870A and another mask portion 870B partially occlude the object of interest (i.e., the ostrich 860A). Regarding digital image 850 and digital image 870, these represent a few cases in which Random Cutout (e.g., PatchCleanser) fails to provide certification, whereas the greedy cutout system 130 succeeds in enabling certifying at least these cases of partial occlusion, as well as other cases of partial occlusion. In this regard, FIG. 8B illustrate non-limiting examples that demonstrate a number of advantages of the greedy cutout system 130, such as better invariance to pixel masking (compared to PatchCleanser) and improved certified robustness to adversarial patches.

More specifically, with PatchCleanser, an image is certified if all 81 combinations of the masked versions of the image are classified correctly. However, during the certification process, there are some masked images (e.g. digital image 810 and digital image 820), which are difficult for PatchCleanser to classify as some masks (e.g., masks 810A-810B and masks 830A-830B) completely occlude the object of interest (e.g., bird 800A and ostrich 820A) beyond recognition as shown in FIG. 8A. It is not possible for Random Cutout trained classifiers to certify such images (e.g., image 800/810 and image 820/830), as shown in FIG. 8A, with the considered mask set. Besides, there has been visual observations that Random Cutout trained classifiers even misclassify some masked images (e.g. digital image 840 and digital image 870) with preserved semantic clues, as shown in FIG. 8B. Misclassification of such images (e.g., digital image 810, digital image 830, digital image 840, digital image 870, etc.) result in underestimating a classifier's certified robustness. In this regard, Random Cutout augmentation is not fully effective or invariant towards pixel masking and limits classifier potential to leverage the defense. Recognizing these misclassifications and inefficiencies of PatchCleanser, the greedy cutout system 130 explores training schemes that improve invariance to pixel masking and techniques to enhance a classifer's certified robustness. In addition, the greedy cutout system 130 is also advantageous in reducing the load and burden on the system 100 with a reduced training dataset compared to PatchCleanser. As discussed in this disclosure, the greedy cutout system 130 improves certification accuracy over PatchCleanser by a large margin and reduces the training burden, for example, via training the classifier with cutouts applied at worst-case regions, i.e., regions that produce the highest classification loss.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. Additionally or alternatively, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A computer-implemented method for a certified robust defense against adversarial patch attacks, the method comprising:
    receiving a source image;
    generating a set of one-mask images using the source image and a first mask at a set of predetermined image regions, each one-mask image including the first mask at a different predetermined image region of the source image, the set of predetermined image regions collectively covering at least every pixel of the source image;
    generating, via a machine learning system, a set of predictions in response to receiving the set of one-mask images;
    selecting a particular one-mask image with a highest prediction loss from among the set of one-mask images;
    generating a set of two-mask images using the selected one-mask image and a second mask at the set of predetermined image regions, each two-mask image including the second mask at a different predetermined image region of the selected one-mask image;
    generating, via the machine learning system, another set of predictions in response to receiving the set of two-mask images;
    selecting a particular two-mask image with a highest prediction loss from among the set of two-mask images;
    generating a training dataset that includes the selected two-mask image; and
    training the machine learning system using the training dataset.

2. The computer-implemented method of claim 1, wherein:
    the set of two-mask images includes the selected two-mask image and non-selected two-mask images; and
    the training dataset does not include the non-selected two-mask images.

3. The computer-implemented method of claim 1, wherein the machine learning system includes a classifier that is trained to perform image classification using the training dataset.

4. The computer-implemented method of claim 1, wherein:
the training dataset further includes the source image; and
the source image does not include any adversarial pixels.

5. The computer-implemented method of claim 1, wherein the first mask covers a same size area as the second mask.

6. The computer-implemented method of claim 1, wherein:
the source image is a digital image without any adversarial pixels; and
the first mask is sized to cover a putative adversarial patch that is applied to no more than 3% of a total image area of the source image.

7. The computer-implemented method of claim 1, further comprising:
receiving a digital image;
employing the machine learning system to generate classification data upon classifying at least one object that is displayed in the digital image; and
controlling an actuator based on the classification data.

8. A system comprising:
at least one electronic processor;
at least one non-transitory computer-readable medium in data communication with the at least one processor, the at least one computer-readable medium having computer readable data including instructions stored thereon that, when executed by the at least one processor, causes the at least one processor to perform a method for defending against adversarial patch attacks with certified robustness, the method including:
receiving a source image;
generating a set of one-mask images using the source image and a first mask at a set of predetermined image regions, each one-mask image including the first mask at a different predetermined image region of the source image, the set of predetermined image regions collectively covering at least every pixel of the source image;
generating, via a machine learning system, a set of predictions in response to receiving the set of one-mask images;
selecting a particular one-mask image with a highest prediction loss from among the set of one-mask images;
generating a set of two-mask images using the selected one-mask image and a second mask at the set of predetermined image regions, each two-mask image including the second mask at a different predetermined image region of the selected one-mask image;
generating, via the machine learning system, another set of predictions in response to receiving the set of two-mask images;
selecting a particular two-mask image with a highest prediction loss from among the set of two-mask images;
generating a training dataset that includes the selected two-mask image; and
training the machine learning system using the training dataset.

9. The system of claim 8, wherein:
the set of two-mask images includes the selected two-mask image and non-selected two-mask images; and
the training dataset does not include the non-selected two-mask images.

10. The system of claim 8, wherein the machine learning system includes a classifier that is trained to perform image classification using the training dataset.

11. The system of claim 8, wherein:
the training dataset further includes the source image; and
the source image does not include any adversarial pixels.

12. The system of claim 8, wherein the first mask covers a same size area as the second mask.

13. The system of claim 8, wherein:
the source image is a digital image without any adversarial pixels; and
the first mask is sized to cover a putative adversarial patch that is applied to no more than 3% of a total image area of the source image.

14. The system of claim 8, further comprising:
a sensor that captures a digital image; and
an actuator that is controlled based on classification data, wherein the machine learning system generates the classification data upon classifying at least one object that is displayed in the digital image.

15. A non-transitory computer readable medium having computer readable data including instructions stored thereon that, when executed by a processor, cause the processor to perform a method for defending against patch attacks, the method including:
receiving a source image;
generating a set of one-mask images using the source image and a first mask at a set of predetermined image regions, each one-mask image including the first mask at a different predetermined image region of the source image, the set of predetermined image regions collectively covering at least every pixel of the source image;
generating, via a machine learning system, a set of predictions in response to receiving the set of one-mask images;
selecting a particular one-mask image with a highest prediction loss from among the set of one-mask images;
generating a set of two-mask images using the selected one-mask image and a second mask at the set of predetermined image regions, each two-mask image including the second mask at a different predetermined image region of the selected one-mask image;
generating, via the machine learning system, another set of predictions in response to receiving the set of two-mask images;
selecting a particular two-mask image with a highest prediction loss from among the set of two-mask images;
generating a training dataset that includes the selected two-mask image; and
training the machine learning system using the training dataset.

16. The non-transitory computer readable medium of claim 15, wherein:
the set of two-mask images includes the selected two-mask image and non-selected two-mask images; and
the training dataset does not include the non-selected two-mask images.

17. The non-transitory computer readable medium of claim 15, wherein the machine learning system includes a classifier that is trained to perform image classification using the training dataset.

18. The non-transitory computer readable medium of claim 15, wherein:

the training dataset further includes the source image; and
the source image does not include any adversarial pixels.

19. The non-transitory computer readable medium of claim 15, wherein the first mask covers a same size area as the second mask.

20. The non-transitory computer readable medium of claim 15, wherein:
- the source image is a digital image without any adversarial pixels; and
- the first mask is sized to cover a putative adversarial patch that is applied to no more than 3% of a total image area of the source image.

* * * * *